United States Patent
Yagi

(10) Patent No.: US 9,133,997 B2
(45) Date of Patent: Sep. 15, 2015

(54) METHOD OF CONTROLLING VEHICLE LAMP AND VEHICLE LAMP

(71) Applicant: KOITO MANUFACTURING CO., LTD., Tokyo (JP)

(72) Inventor: Takayuki Yagi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 82 days.

(21) Appl. No.: 14/024,744

(22) Filed: Sep. 12, 2013

(65) Prior Publication Data
US 2014/0071704 A1    Mar. 13, 2014

(30) Foreign Application Priority Data
Sep. 13, 2012 (JP) .................. 2012-201385

(51) Int. Cl.
*F21V 1/00* (2006.01)
*F21S 8/10* (2006.01)

(52) U.S. Cl.
CPC ........... *F21S 48/125* (2013.01); *F21S 48/1154* (2013.01); *F21S 48/1388* (2013.01); *F21S 48/145* (2013.01); *F21S 48/1757* (2013.01)

(58) Field of Classification Search
CPC ... F21S 48/115; F21S 48/1154; F21S 48/125; F21S 48/1388; F21S 48/14; F21S 48/145; F21S 48/1757

USPC .......... 362/509, 516–518, 538–539, 543–545
See application file for complete search history.

(56) References Cited

U.S. PATENT DOCUMENTS
5,938,319 A    8/1999  Hege

FOREIGN PATENT DOCUMENTS
JP       09104288 A    4/1997

*Primary Examiner* — Jason Moon Han
(74) *Attorney, Agent, or Firm* — Osha Liang LLP

(57) ABSTRACT

A vehicle lamp includes a two-dimensional image forming device, a light source, and a controller. The image forming device is disposed near a rear focal point of a projection lens and has a projection plane formed of plural optical elements arranged in a matrix manner. The light source irradiates with light the projection plane. The controller individually drives the optical elements to form, on the projection plane, an illumination pattern having a shape corresponding to a light distribution pattern projected by the projection lens ahead the vehicle lamp. The controller sets an output rate per unit time of the optical elements disposed at an end portion of the projection plane to be lower than that of the other optical elements. The light is output from the optical elements disposed at the end portion of the projection plane towards the projection lens at the output rate per unit time thereof.

10 Claims, 8 Drawing Sheets

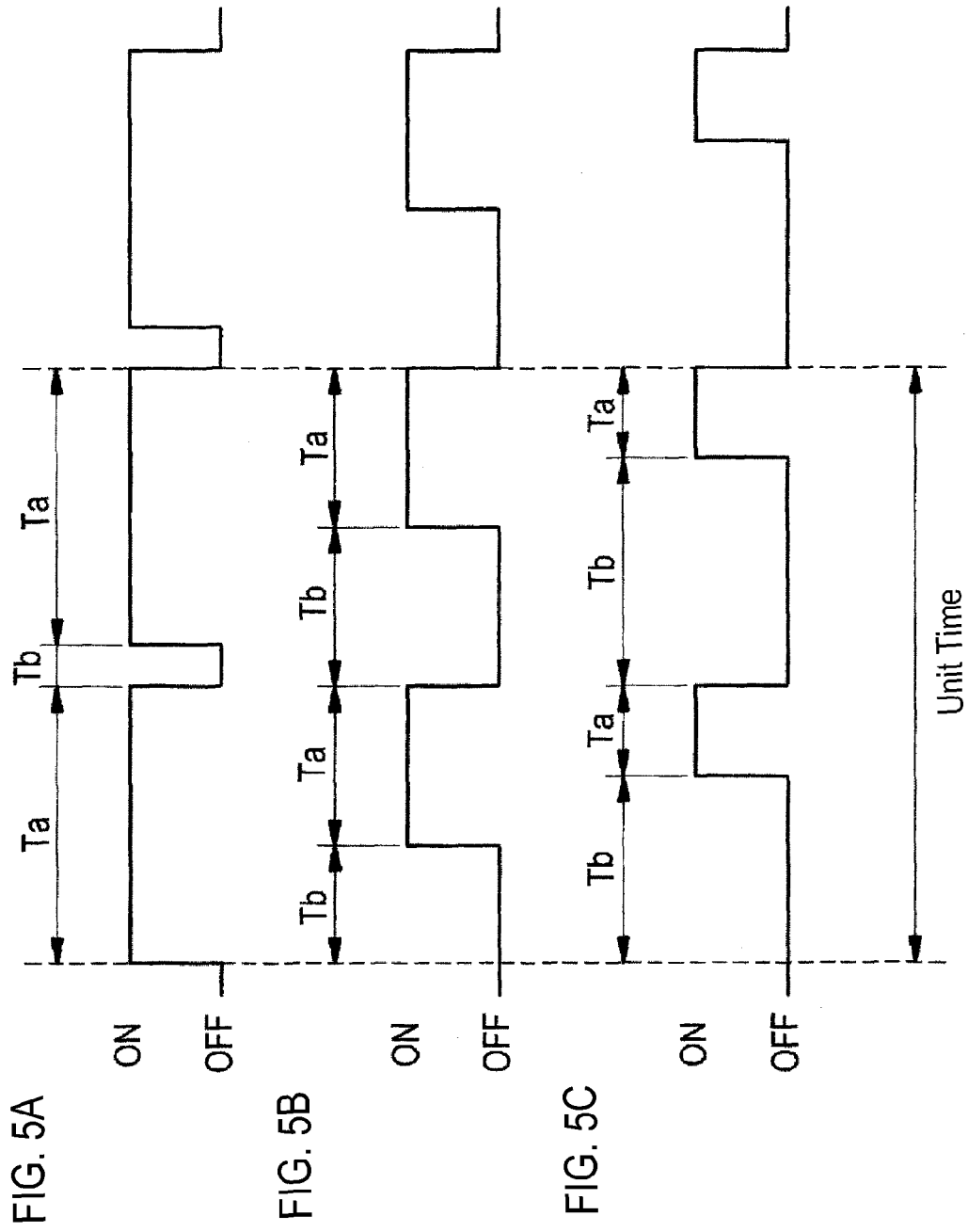

METHOD OF CONTROLLING VEHICLE LAMP AND VEHICLE LAMP

CROSS REFERENCE TO RELATED APPLICATION(S)

This application is based on and claims priority under 35 U.S.C. §119 to Japanese Patent Application No. 2012-201385 (filed on Sep. 13, 2012), the entire contents of which are incorporated herein by reference.

BACKGROUND

1. Technical Field

The invention relates to a vehicle lamp to be mounted on a vehicle and a method of controlling the same.

2. Description of the Related Art

JP 1109-104288 A (corresponding to U.S. Pat. No. 5,938, 319) describes a lighting device including a DMD (Digital Mirror Device) provided with hundreds to millions of very small reflection elements. JP H09-104288 A has proposed easily changing the characteristic of light flux emitted from the lighting device extensively with the respective reflection elements of the DMD.

SUMMARY

Light from a light source is incident onto a projection plane of a DMD while being spread to some extent. At this time, light which is incident onto the projection plane at a boundary of the projection plane is projected forwardly of a lamp by a projection lens, while light directed toward an outside of the projection plane is not incident onto the projection lens. Therefore, a clear boundary line between a dark portion and a light portion, which is caused by the boundary of the projection plane, is formed in a light distribution pattern which is projected ahead of the lamp by the projection lens, to thereby make a user feel that something is out of place.

The invention provides a method of controlling a vehicle lamp and a vehicle lamp that can make a boundary line between a dark portion and a light portion caused by a boundary of a projection plane be inconspicuous and that can form a natural light-distribution pattern without a user feeling that something is out of place.

According to an aspect of the invention, a vehicle lamp includes a projection lens, a two-dimensional image forming device, and a light source. The two-dimensional image forming device is disposed near a rear focal point of the projection lens and includes a projection plane formed of a plurality of optical elements arranged in a matrix manner. The light source illuminates with light the projection plane of the two-dimensional image forming device. A method of controlling the vehicle lamp includes forming a light distribution pattern by projecting an illumination pattern, which is formed on the projection plane by driving the optical elements individually, ahead of the vehicle lamp by the projection lens. Light is output toward the projection lens from each optical element at an output rate per unit time of each optical element. The output rates per unit time of the optical elements disposed at an end portion of the projection plane are set to be lower than those of the optical elements other than the optical elements disposed at the end portion of the projection plane.

Also, the output rates of the optical elements may be set to be lowered gradually from a center of the projection plane toward the end portion of the projection plane.

Also, of the optical elements which are set to be in an output state where the optical elements output the light from the light source ahead of the vehicle lamp through the projection lens, the output rates of the optical elements disposed at the end portion of the projection plane may be set to be lower than those of the optical elements other than the optical elements disposed at the end portion of the projection plane.

Also, the optical elements may be configured to be switchable between (i) an output state where the light from the light source is output ahead of the vehicle lamp through the projection lens and (ii) a non-output state where the light from the light source is not incident onto the projection lens. Ratios Ta/Tb of the optical elements disposed at the end portion of the projection plane may be set to be lower than those of the optical elements other than the optical elements disposed at the end portion of the projection plane, where Ta of an optical element in interest denotes a time during which the optical element in interest is in the output state within the unit time. Tb of the optical element in interest denotes a time during which the optical element in interest is in the non-output state within the unit time.

Also, the end portion of the projection plane may contain two sides of the projection plane. The two sides face each other.

According to another aspect of the invention, a vehicle lamp includes a projection lens, a two-dimensional image forming device, a light source, and a controller. The two-dimensional image forming device is disposed near a rear focal point of the projection lens and includes a projection plane formed of a plurality of optical elements arranged in a matrix manner. The light source irradiates with light the projection plane of the two-dimensional image forming device. The controller individually drives the optical elements to form, on the projection plane, an illumination pattern having a shape corresponding to a light distribution pattern to be projected by the projection lens ahead the vehicle lamp. Light is output toward the projection lens from each optical element at an output rate per unit time of each optical element. The controller sets the output rates per unit time of the optical elements disposed at an end portion of the projection plane to be lower than those of the optical elements other than the optical elements disposed at the end portion of the projection lens.

Also, the controller may set the output rates of the optical elements to be lowered gradually from a center of the projection plane toward the end portion of the projection plane.

Also, the controller may set the output rates of the optical elements so that of the optical elements which are set to be in an output state where the optical elements output the light from the light source ahead of the vehicle lamp through the projection lens, the output rates of the optical elements disposed at the end portion of the projection plane are set to be lower than those of the optical elements other than the optical elements disposed at the end portion of the projection plane.

Also, the optical elements may be configured to be switchable between (i) an output state where the light from the light source is output ahead of the vehicle lamp through the projection lens and (ii) a non-output state where the light from the light source is not incident onto the projection lens. The controller may set ratios Ta/Tb of the optical elements disposed at the end portion of the projection plane to be lower than those of the optical elements other than the optical elements disposed at the end portion of the projection plane, where Ta of an optical element in interest denotes a time during which the optical element in interest is in the output state within the unit time, and Tb of the optical element in interest denotes a time during which the optical element in interest is in the non-output state within the unit time.

Also, the end portion of the projection plane may contain two sides of the projection plane. The two sides face each other.

According to the method of controlling a vehicle lamp and the vehicle lamp, since the output rates of light directed toward the projection lens from the optical elements disposed at the end portion of the projection plane are set to be low, it is possible to dim an outer periphery of the light distribution pattern that is formed ahead of the vehicle lamp through the projection lens. Thereby, an unnatural contrast of the light distribution pattern generated due to the boundary of the projection plane can be made inconspicuous. Thus, it is possible to form the light distribution pattern having a natural appearance.

BRIEF DESCRIPTION OF THE DRAWINGS

FIGS. 5A to 5C are views showing control signals for controlling a reflection element;

DETAILED DESCRIPTION OF EMBODIMENTS

Hereinafter, vehicles according to illustrative embodiments of the invention will be described with reference to the accompanying drawings.

Figure 1:
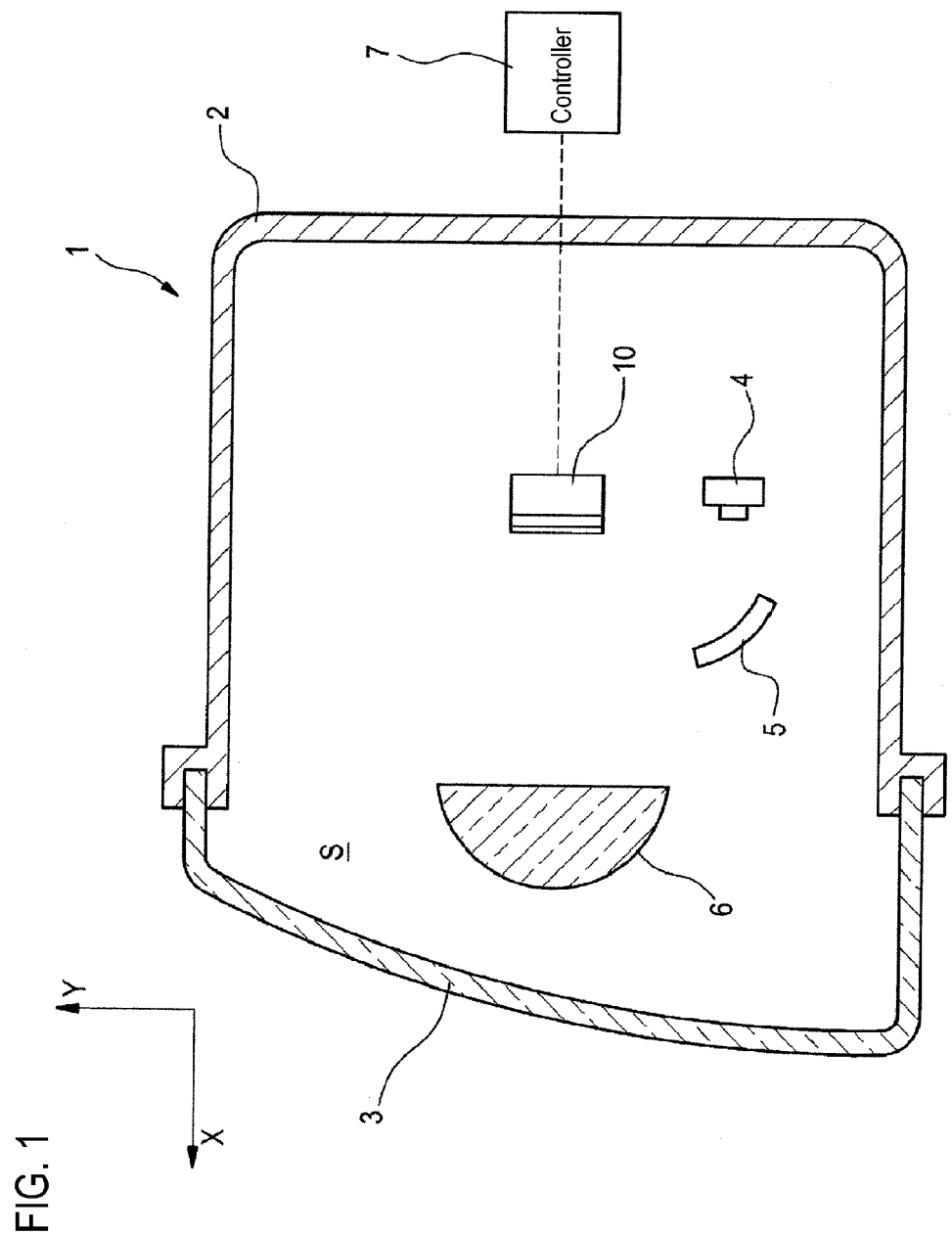
FIG. 1 is a side section view of a vehicle headlamp according to an illustrative embodiment of the invention.

FIG. 1 is a side section view showing a vehicle headlamp 1 which is an example of a vehicle lamp. The vehicle lamp 1 includes a lamp body 2 having an opening part which opens into a front side of the lamp and an outer cover 3 which is made of a transparent resin material and which is attached to the opening part. The outer cover 3 is disposed so as to close the opening part of the lamp body 2 from the front side of the lamp body 2. The outer cover 3 and the lamp body 2 form a lamp chamber S. In the following description, a direction indicated by an arrow X shown in FIG. 1 will be referred to as a front direction that is a light illumination direction, and a direction indicated by an arrow Y shown in FIG. 1 will be referred to as an upper direction.

A DMD (Digital Mirror Device) 10, an LED 4, a reflector 5, and a projection lens 6 are disposed in the lamp chamber S. The DMD 10 serves as a two-dimensional image forming device. The LED 4 serves as a light source. The reflector 5 reflects light from the LED 4 toward the DMD 10. The projection lens 6 projects light from the DMD 10 in the front direction. Also, a controller 7 is provided outside the lamp chamber S. The controller 7 controls an operation of the DMD 10.

Figure 2:
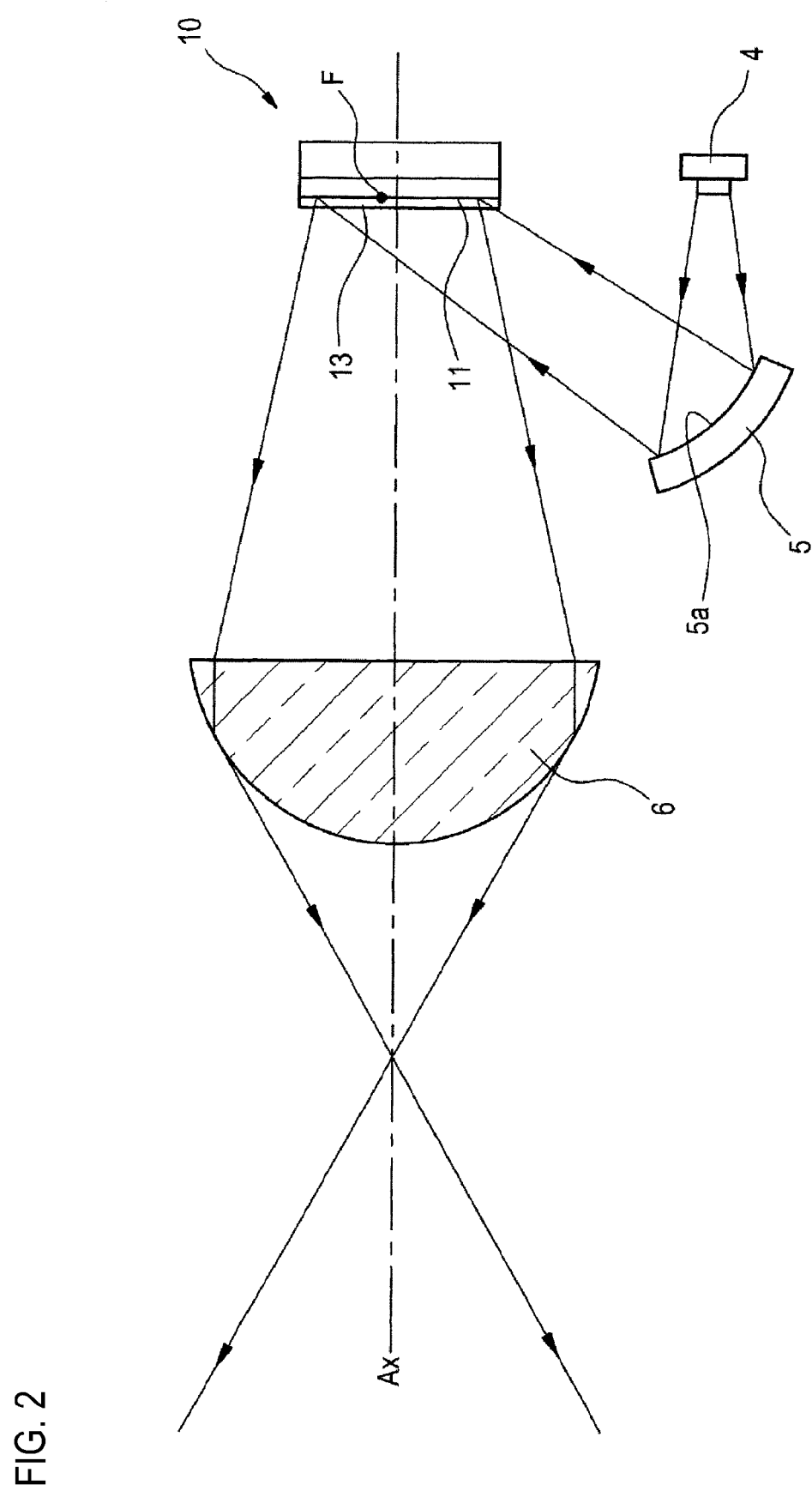
FIG. 2 is a partially enlarged view of FIG. 1.

FIG. 2 is a view illustrating respective members disposed in the lamp chamber S on an enlarged scale.

A projection plane 11 is formed on a front-side surface of The DMD 10. The projection plane 11 outputs the light from the LED 4 toward the projection lens 6. The reflector 5 is provided with a reflection surface 5a that reflects the light emitted from the LED 4 toward the projection plane 11 of the DMD 10. The vehicle headlamp 1 is configured so that the projection plane 11 of the DMD 10 is illuminated with the light emitted from the LED 4 and reflected by the reflector 5.

The projection lens 6 is disposed so that an optical axis Ax thereof is directed in a front and rear direction of the lamp. The projection lens 6 is disposed on the front side of the DMD 10 so that a rear focal point F of the projection lens 6 is substantially coincident with the projection plane 11 of the DMD 10. With this configuration, an illumination pattern formed on the projection plane 11 of the DMD 10 is projected ahead of the projection lens 6 with inverted up-to-bottom and left-to-right and enlarged.

Figure 3:
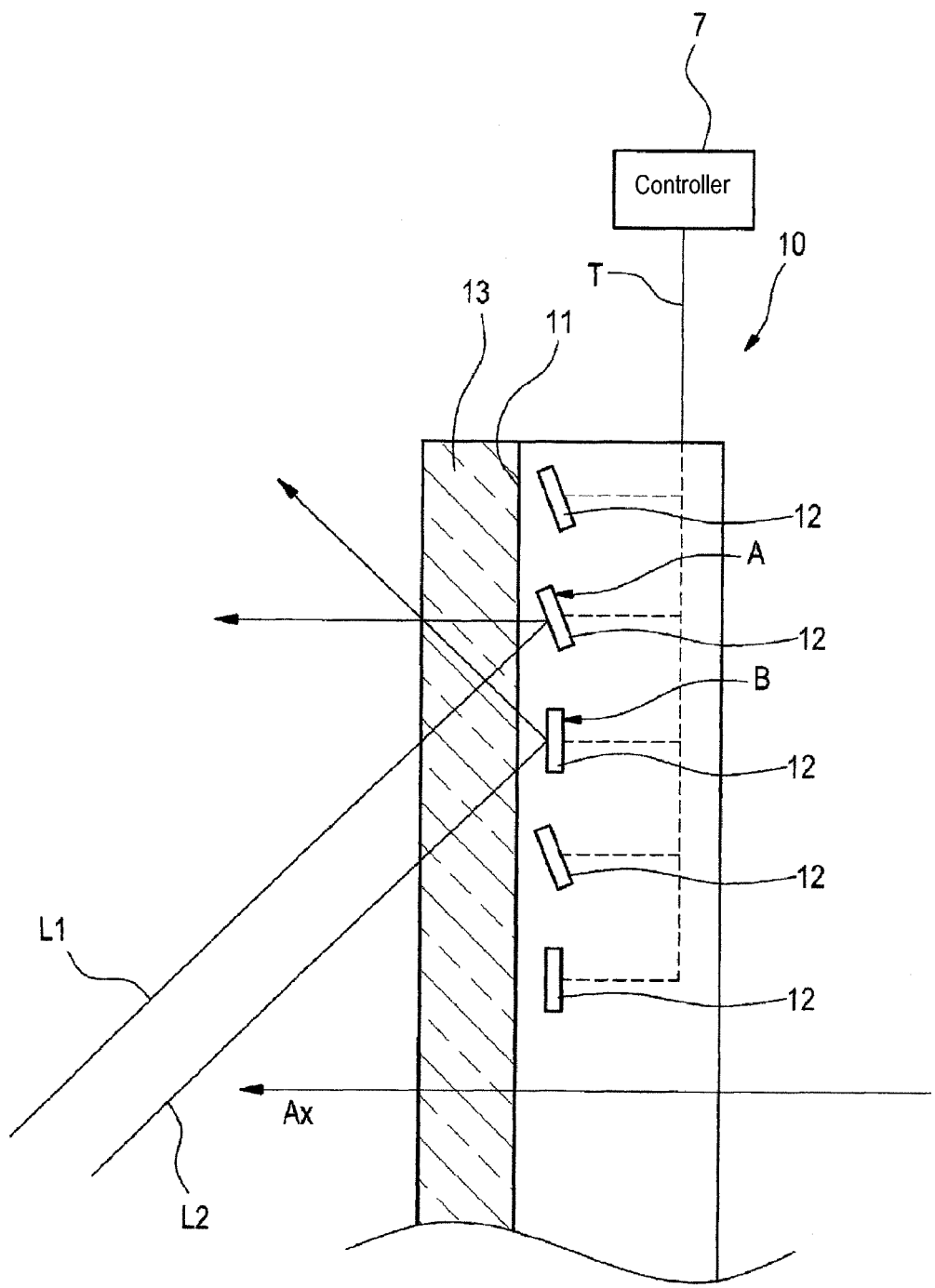
FIG. 3 is a partially enlarged view showing a DMD and a controller.

FIG. 3 is a view showing the DMD 10 and the controller 7, which controls the DMD 10. A side, on which the projection plane 11 is formed, of the DMD 10 shown in FIG. 3 is a front side. Also, FIG. 3 shows an upper end portion of the DMD 10.

The DMD 10 is a device that is formed by means of MEMS (Micro Electro Mechanical System) technology. Specifically, the DMD 10 is a two-dimensional image forming device in which a plurality of reflection elements 12 (which are one example of optical elements) are arranged on a substrate in a matrix manner. The projection plane 11, which reflects the light from the LED 4 by means of the reflection elements 12, is formed on the front side of the DMD 10. The projection plane 11 may be formed of ten thousands to million reflection elements. A protection film 13 is provided on the projection plane.

The plurality of reflection elements 12 are provided so as to be rotatable about respective rotation axes. The reflection elements 12 may be controlled, by applying voltages to the respective reflection elements 12 individually, so the reflective mirrors 12 are individually switched between a state where the reflection elements 12 remain stationary with a posture indicated by an arrow A and a state where the reflection elements 12 remain stationary with a posture indicated by an arrow B.

If the reflection element 12 is controlled to take the posture indicated by the arrow A (i.e., take such a posture that an angle between a reflection surface of the reflection element 12 and the optical axis Ax is about 45 degrees), light L1 incident onto the reflection element 12 is output so as to be incident onto the projection lens 6. Thereby, the light is output ahead of the lamp by the projection lens 6. The case where the reflection element 12 is controlled to take such a posture that the light from the LED 4 is caused to be incident onto the projection lens 6 in this manner will be referred to as "the reflection element 12 is controlled to be in an output state."

In contrast, if the reflection element 12 is controlled to take the posture indicated by the arrow B (i.e., take such a posture that the reflection surface of the reflection element 12 is substantially orthogonal to the optical axis Ax), light L2 incident onto the reflection element 12 is output in a direction turning away from the projection lens 6 and is not incident onto the projection lens 6. The case where the reflection element 12 is controlled to take such a posture that light is caused not to be incident onto the projection lens 6 will be referred to as "the reflection element 12 is controlled to be in a non-output state."

The reflection elements 12 are individually driven in accordance with a control signal transmitted from the controller. 7 and may be switched to the output state or the non-output state. Each reflection element 12 is connected to the controller 7 through a signal line T. Each reflection element 12 is controlled to be in the output state, in accordance with an ON signal output from the controller 7. Also, each reflection element 12 is controlled to be in the non-output state, in accordance with an OFF signal output from the controller 7. By switching each reflection element 12 to the output state or the non-output state, the controller 7 can form a desired illumination pattern 40 (which will be described later) on the projection plane 11. Then, the illumination pattern 40 formed on the projection plane 11 is projected ahead of the lamp by the projection lens 6, to thereby form a light distribution pattern 30.

Figure 4A:
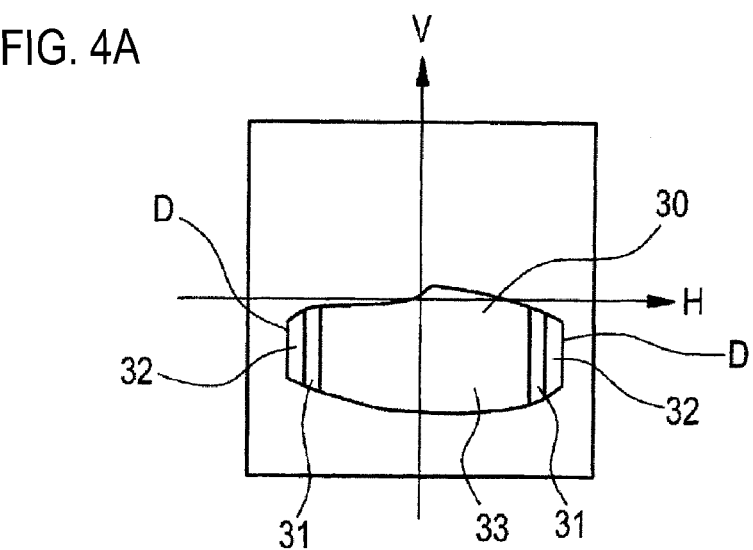
FIG. 4A is a view showing a light distribution pattern formed by a vehicle headlamp according to the illustrative embodiment.
Figure 4B:
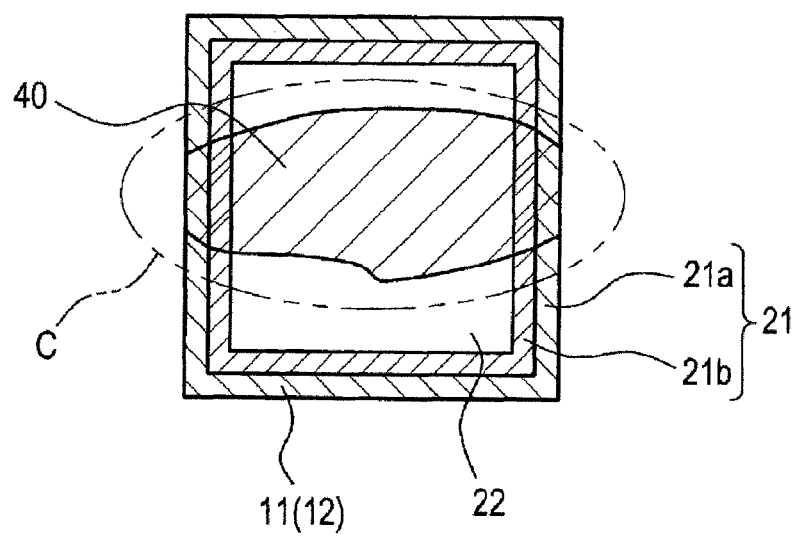
FIG. 4B is a view showing an illumination pattern for forming the light distribution pattern shown in FIG. 4A.
Figure 4C:
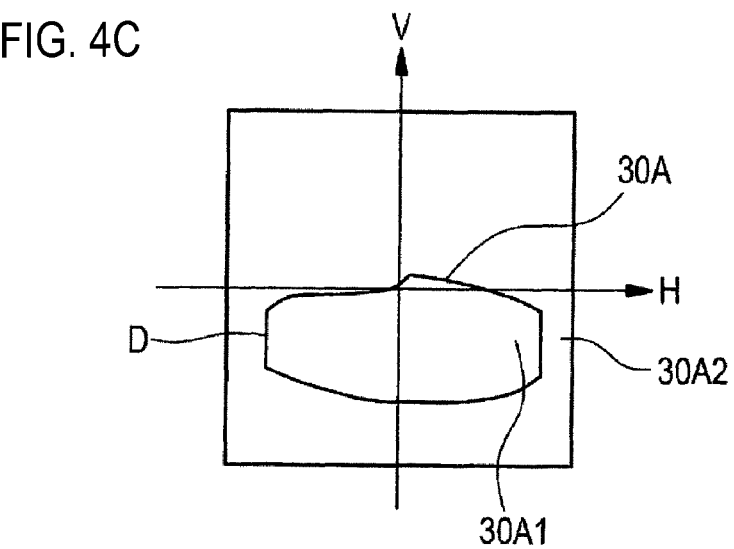
FIG. 4C is a view showing a light distribution pattern of a comparative example.

FIGS. 4A to 4C show the light distribution pattern 30 and the illumination pattern 40.

To form the light distribution pattern 30 as shown in FIG. 4A (a low beam distribution pattern) ahead of the lamp, the illumination pattern 40 as shown in FIG. 4B is formed on the projection plane 11. The illumination pattern 40 formed on the projection plane 11 is projected ahead of the lamp by the projection lens 6, to thereby form the light distribution pattern 30. FIGS. 4A and 4C show light distribution patterns 30, 30A which are formed on a virtual vertical screen that is located 25 m ahead of the vehicle headlamp 1.

FIG. 4B shows the illumination pattern 40 formed on the projection plane 11. A range C in which the light is incident onto the projection plane 11 from the LED 4 is configured so as to be similar to a shape of the illumination pattern 40. Then, the reflection elements 12 which are in a region corresponding to the shape of the light distribution pattern 30 are set to be in the output state, and the other reflection elements 12 are set to be in the non-output state. As such, the reflection elements 12 which are in a specific region are set to be in the output state, and the other reflection elements 12 are to be in the non-output state. Thereby, the illumination pattern 40 is formed on the projection plane 11. Here, the "illumination pattern 40" refers to a shape formed by the plurality of reflection elements 12 which are set to be in the output state. It is noted that the reflection elements 12 are not shown in FIG. 4B.

Here, the projection plane 11 is illuminated with the light which is, emitted from the LED 4 and is spread to some extent. Therefore, as shown in FIG. 4B, even an outside of the projection plane 11 is unintentionally illuminated with a part of the light emitted from the LED 4.

In this case, at end portions, in the left and right directions, of the illumination pattern 40 on the projection plane 11, the light emitted from the LED 4 is reflected in the projection plane 11, but the light emitted from the LED 4 is not reflected outside the projection plane 11. Therefore, if the DMD 10 were to be left as it is, as shown in the light distribution pattern 30A of a comparative example in FIG. 4C, a bright portion 30A1 which is illuminated brightly with the reflected light would be formed inside the light distribution pattern 30A, and a dark portion 30A2 which is not illuminated with light would be formed outside the light distribution pattern 30A. Therefore, a user would recognize an extreme bright and dark boundary line D in a contour of the light distribution pattern 30A with his/her eyes and would have a feeling that something is out of place. Such a feeling would be more enhanced if the bright and dark boundary line of the light distribution pattern 30A were to look a straight line shape as shown in FIG. 4C.

Then, in this exemplary embodiment, an output rate(s) per unit time of the light output toward the projection lens 6 from the reflection elements 12, which are disposed in an outer peripheral region 21 of the projection plane 11, are set to be lower than that (those) of the light output toward the projection lens 6 from the reflection elements 12, which are disposed in a center region 22 of the projection plane 11. With this configuration, an outer peripheral portion of the light distribution pattern 30 is dimmed, and the bright and dark boundary line D becomes inconspicuous. It is noted that the "output rate per unit time" referred to here is an index showing how much light is output toward the projection lens 6 from the reflection element(s) 12 within the unit time. The "output rate per unit time of light output toward the projection lens 6 from the reflection element 12" may be referred to as an "output rate per unit time of light output from the reflection element 12" or an "output rate per unit time of the reflection element 12," or may be simply referred to as an "output rate," an "output rate per unit time," or a "light output rate per unit time."

Specifically, the controller 7 sets a ratio, per unit time, of the output state and the non-output state in each reflection element 12, to thereby adjust an apparent brightness of the region, which is illuminated by each reflection element 12.

FIG. 5 shows examples of a control signal output from the controller 7.

As described above, the controller 7 transmits the ON signal to the reflection element 12 so as to set the reflection element 12 to be in the output state. Also, the controller 7 transmits the OFF signal to the reflection element 12 so as to set the reflection element 12 to be in the non-output state. Here, as shown in FIGS. 5A to 5C, the controller 7 finely switches the control signal between the ON signal and the OFF signal. The controller 7 controls a ratio Ta/Tb where Ta denotes a time during which the ON signal is transmitted in the unit time and Tb denotes a time during which the OFF signal is transmitted in the unit time. In other words, the controller 7 controls a duty ratio of an OFF period and an ON period of the control signal. Here, the unit time is such a time that a human being cannot recognize, as blinking light, change in luminance caused by switching of the reflection element(s) 12 between the output state and the non-output state. For example, the unit time is 1/60 second.

By controlling the ratio Ta/Tb in this manner, it is possible to control the apparent brightness of the region, which is illuminated by the reflection elements. For example, if the controller 7 transmits a control signal having a small ratio of Ta/Tb to the reflection element 12, it is possible to lower the apparent brightness of the region which is illuminated by the reflection element 12. In this manner, by setting the ratio Ta/Tb of the control signal, the controller 7 sets the light output rate per unit time of the reflection element 12.

Specifically, the controller 7 inputs the control signal shown in FIG. 5A to the reflection elements 12 included in the center region 22 of the projection plane 11, the control signal shown in FIG. 5B to the reflection elements 12 included in a second outer peripheral region 21b of the projection plane 11, and the control signal shown in FIG. 5C to the reflection elements 12 included in a first outer peripheral region 21a of the projection plane 11. Here, the following inequality holds:

$$T1 > T2 > T3$$

where T1 denotes the ratio Ta/Tb of the control signal shown in FIG. 5A, T2 denotes the ratio Ta/Tb of the control signal shown in FIG. 5B, and T3 denotes the ratio Ta/Tb of the control signal shown in FIG. 5C. In other words, the output rate is higher at the center of the projection plane 11, and the output rate gets smaller in a stepwise manner as approaching the outer peripheral end portion.

When the illumination pattern 40 in which the output rate is low at the end portion thereof is formed on the projection plane 11 in the above described manner and is projected forward by the projection lens 6, it is possible to form ahead of the lamp the light distribution pattern 30 shown in FIG. 4A in which illuminance is low at the end portion thereof.

More specifically, a center region 33 of the light distribution pattern 30 shown in FIG. 4A is illuminated by the reflection elements 12 to which the control signal of FIG. 5A having the largest ratio Ta/Tb is input. Also, right and left end regions 32 of the light distribution pattern 30 are illuminated by the reflection elements 12 to which the control signal of FIG. 5C having the smallest ratio Ta/Tb is input. Furthermore, right and left intermediate regions 31 between the end regions 32 and the center region 33 are illuminated by the reflection elements 12 to which the control signal of FIG. 5C having the ratio Ta/Tb taking an intermediate value is input.

Then, the light distribution pattern 30 is formed so, that the center region 33 is most brightly illuminated and that the light distribution pattern 30 gets darker toward the end regions 32 in a stepwise manner. Since the illuminance of the end regions 32 is set to be low, the bright and dark boundary line D is inconspicuous, and it is possible to form the light distribution pattern 30 having a natural appearance. Also, since the intermediate regions 31 having, the intermediate brightness are formed between the brightest center region 33 and the darkest end regions 32, it is possible to form the light distribution pattern 30 having a moderate illuminance distribution and having the natural appearance.

As described above, according to the method of controlling the vehicle lamp of this exemplary embodiment, the light output rate(s) per unit time of the reflection elements 12, which are located at the end portions of the projection plane 11, is set to be lower than that (those) of the reflection elements 12 other than the reflection elements 12 located at the end portions thereof. Thus, it is possible to dim the end portions 32 of the formed light distribution pattern 30, and it is possible to make the bright and dark boundary line D inconspicuous at the end portions 32 of the light distribution pattern 30. Accordingly, it is possible to provide the vehicle lamp which can form the light distribution pattern 30 having the natural appearance.

It should be noted that the above described control of the output rates may not be performed for all the reflection elements 12 on the projection plane 11, but may be performed only for the reflection elements 12 included in the range C shown in FIG. 4B. Also, control for decreasing the output rate(s) may be performed only for the reflection elements 12, which are included in the region C and are disposed on the outer peripheral ends thereof. Thereby, control load on the controller 7 can be reduced.

The outer peripheral region 21 (21*a*, 21*b*) may be set to be a region extending inwardly from the outer peripheral end portion of the projection plane 11 by 10% or 20% of lengths of the respective sides of the projection plane 11. Also, an area of the outer peripheral region 21 (21*a*, 21*b*) may be in a range of 10% to 20% of an area of the projection plane 11 or 10% or 20% of the area of the projection plane 11. In the embodiment described above, the outer peripheral region 21 (21*a*, 21*b*) has a frame shape including the outer peripheral end portion of the projection plane 11. However, the invention is not limited thereto. For example, the first outer peripheral region 21*a* may not include the entire circumference of the outer peripheral end portion of the projection plane 11, but only include a portion thereof, such as only any one end portion of the projection plane 11 in the upper and lower directions or any one end portion of the projection plane 11 in the right and left directions. Furthermore, the shape of the outer peripheral region 21 (21*a*, 21*b*) may be set in accordance with the shape of the illumination pattern 40 to be formed on the projection plane 11.

In the embodiment described above, the following control has been exemplified. That is, the illuminace pattern 40 is divided into three regions of the first outer peripheral region 21*a*, the second outer peripheral region 21*b*, and the center region 22, and the output rate gets smaller in the stepwise manner as approaching from the center to the outer region. However, the invention, is not limited thereto. For example, a center point may be defined in the center of the illumination pattern, and the reflection element 12 may be controlled so that the light output rate per unit time continuously gets smaller as a distance from the center point increases.

In the embodiment described above, the light distribution pattern has been exemplified which is required to have substantially uniform illumination in a region other than the right and left ends. However, the invention is not limited thereto. For example, a vehicle lamp may form a light distribution pattern in which a specific region (for example, an eye point of an oncoming vehicle) is required to have illuminances of being non-uniform and lower than those of the other region.

In this case, the light output rate(s) per unit time in the specific region (the eye point and the like) may be lower than that (those) in the other region. Thereby, it is realized that the illuminances in the specific region is lower than those in the other region. For example, by controlling the ratios Ta/Tb of the reflection elements 12, it is possible to control the output rates.

At this time, an upper limit of the output rate(s) of light output from the reflection elements 12, which are located on an outer peripheral side on the projection plane 11 (for example, in the outer peripheral region 21 (21*a*, 21*b*)) is set to be lower than that of the output rate(s) of light output from the reflection elements 12 near the center of the projection plane 11 (for example, in the center region 22). With this configuration, it is possible to lower the luminances near the end portions of the light distribution pattern and to make the bright and dark boundary line inconspicuous. Alternatively, instead of setting the upper limit to be a low value, the output rate(s) may be corrected by multiplying the output rate(s) of the reflection element 12 on the outer peripheral side by a coefficient(s) which is less than 1, and the control signal may be transmitted to the reflection elements 12 on the outer peripheral side based on the corrected output rate(s). Even with this configuration, it is possible to lower the luminances near the end portions of the light distribution pattern.

Figure 6A:
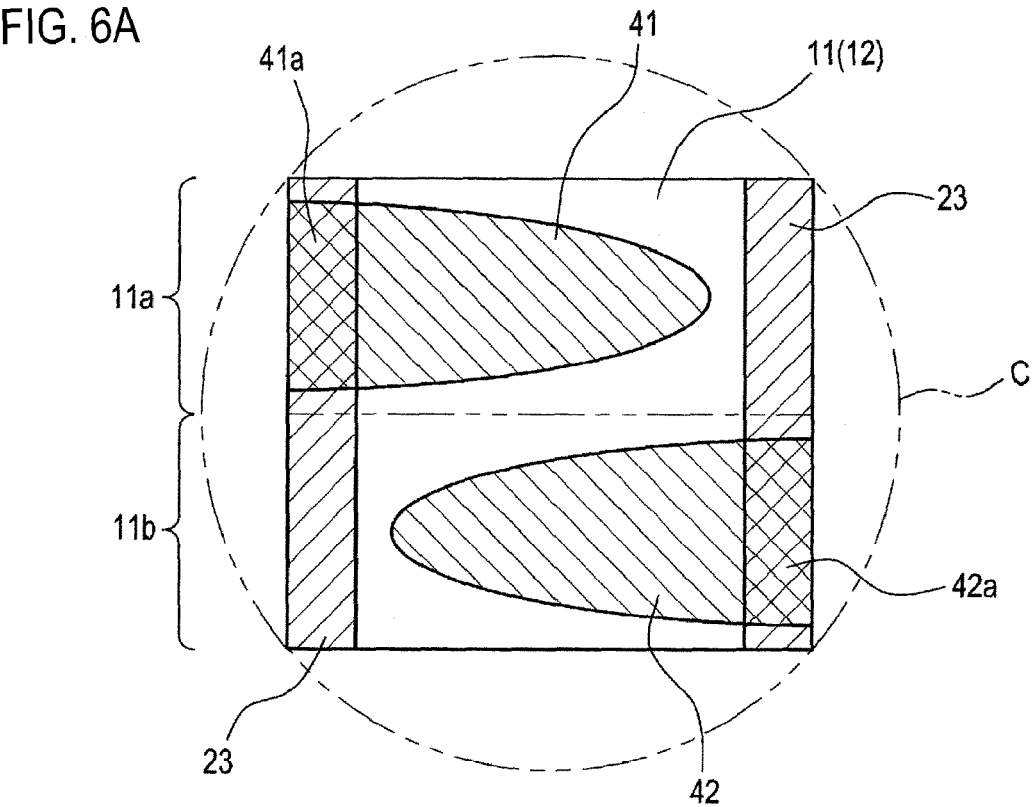
FIG. 6A is a view showing a light distribution pattern according to another example.
Figure 6B:
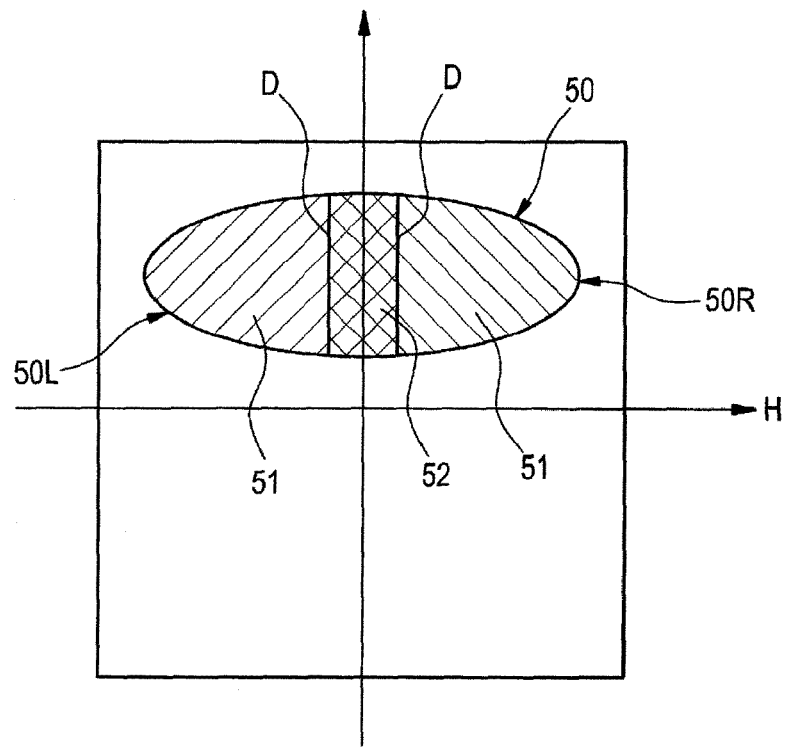
FIG. 6B is a view showing a light distribution pattern which is formed using the illumination pattern shown in FIG. 6A.

In the above description, the example has been described in which the illuminace pattern 40 formed on the projection plane 11 is projected as it is ahead of the lamp by the projection lens 6. However, the invention is not limited thereto. FIGS. 6A and 6B shows an example in which two illumination patterns 41, 42 are formed on the projection plane 11, and these two illumination patterns 41, 42 are projected ahead of the lamp with being superimposed each other. FIG. 6A shows the illumination patterns 41, 42. FIG. 6B shows a light distribution pattern 50 formed by the illumination patterns 41, 42 shown in FIG. 6A.

In the example shown in FIG. 6A, the range C of the light, which comes from the LED4 and is incident onto the projection plane 11, covers almost the entire surface of the projection plane 11 so that the projector pane 11 is effectively used. Also, the projection plane 11 is divided into two regions in the upper and lower directions, that is, upper and lower projection regions 11a, 11b. Then, the illumination pattern 41 constituting a left side 50L of the light distribution pattern 50 (see FIG. 6B) is formed in the upper projection region 11a, and the illumination pattern 42 constituting a right side 50R of the light distribution pattern 50 is formed in the lower projection region 11b.

Outer peripheral regions 23 having a band shape are set on the projector pane 11 along a pair of sides which face each other. The output rate(s) per unit time of light which are output toward the projection lens 6 from the reflection elements 12 in the outer peripheral region 23s are set to be lower than those of the other reflection elements 12.

In this example, the projection lens 6 projects the illumination patterns 41, 42 forwardly with superimposing the illumination patterns 41, 42 so that the illumination patterns 41, 42 are continuous in the right and left directions. Thereby, the light distribution pattern 50 which is long in the right and left directions is formed as shown in FIG. 6B.

Here, let consider a case where the output rates of light from the reflection elements 12 in the outer peripheral regions 23 are not set to be low. In this case, if a light distribution pattern is formed by superimposing pattern end portions 41a, 42a of the illumination patterns 41, 42, a bright and dark boundary line is noticeable. That is, where an intensity of light output by each of the illumination patterns 41, 42 is 100, a luminance in a center region 52 of the light distribution pattern 50 in which the illumination pattern 41, 42 are superimposed is 200, and luminances in regions 51 which are outside of the center region 52 in the right and left directions are 100 because the illumination pattern 41, 42 are not superimposed there. As a result, bright and dark boundary lines faulted at boundaries between the center region 52 having 200 in luminance and the regions 51 having 100 in luminance are conspicuous.

However, according to the vehicle headlamp 1 of this embodiment, the output rates of the reflection elements 12 which are disposed in the end portions 41a, 42a are set to be low. Thereby, the luminances in end portions, which are formed by the reflection elements 12 disposed in the end portions 41a, 42a, of the right and left sides 50R, 50L of the light distribution pattern 50 are reduced. Thus, a region in which the illumination patterns 41, 42 are superimposed is superimposition of a bright region and a region darker than the bright region or superposition of dark regions. Accordingly, a difference in luminance between the center region 52 and the right and left outside regions 52 can be reduced, and the bright and dark boundary lines D can be made inconspicuous.

More preferably, the output rates of the reflection elements 12 are set so that an output amount of light in the end portions 41a, 42a gradually decreases from 100% to 0%. As a result, the luminance in the center region 52 of the light distribution pattern 50 is 100 due to the supposition of the lights each having 50 in luminance. Also, the luminances in the regions 51 on the left and right outer sides thereof are 100. Accordingly, the bright and dark boundary line D is not formed, and it is possible to form a light distribution pattern having a very natural appearance.

Figure 7:
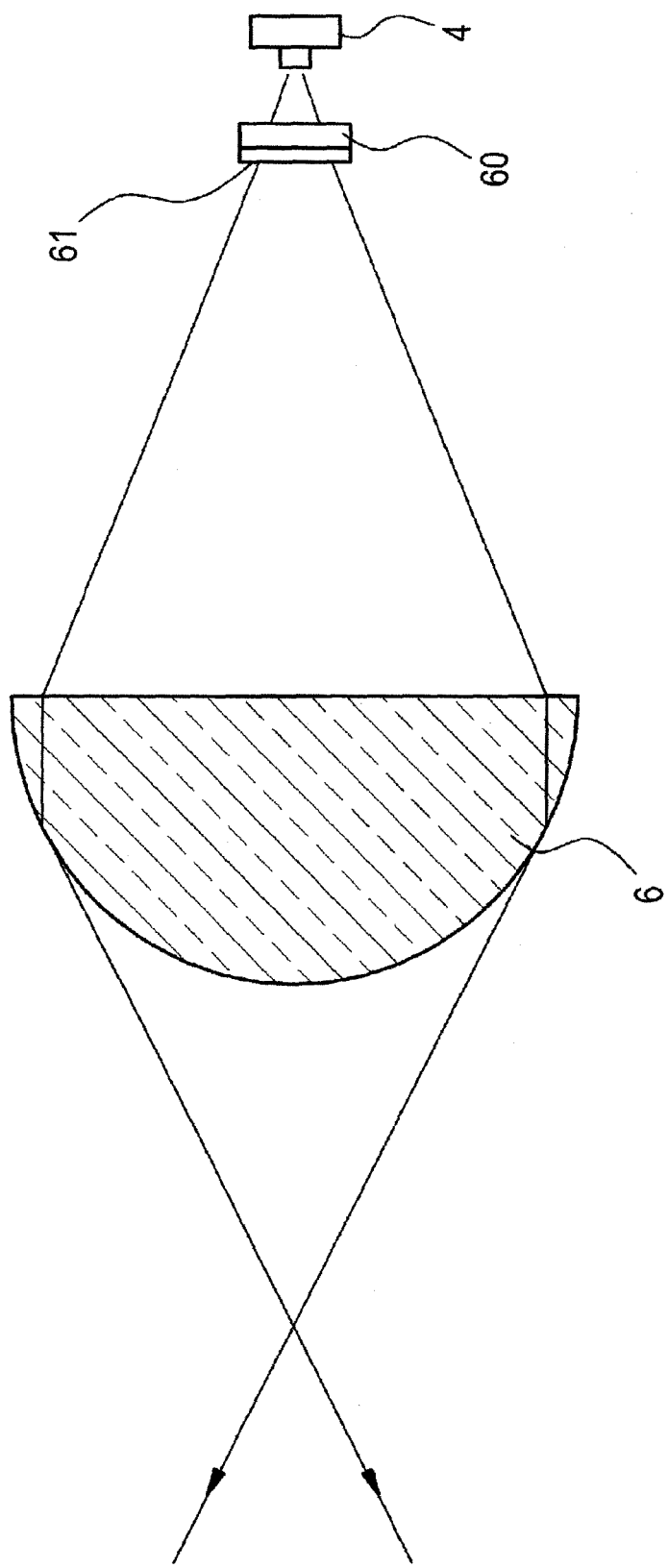
FIG. 7 is a section view showing a vehicle headlamp according another illustrative embodiment of the invention.

In the exemplary embodiment described above, the DMD 10 is used as the two-dimensional image device. However, the invention is not limited thereto. For example, a liquid crystal device may be used as the two-dimensional image forming device. FIG. 7 shows members in the lamp chamber S in the case where a liquid crystal device 60 is used as the two-dimensional image forming device.

In the lamp chamber S, the LED 4, the liquid device 60 and the projection lens 6 are arranged in order from the rear side in terms of the optical axis Ax direction. A projection plane 61 that transmits light from LED4 is formed on a front side surface (a surface on the projection lens 6 side) of the liquid crystal device 60. An illumination pattern formed on the projection plane 61 of the liquid crystal device 60 is projected forwardly with being with inverted up-to-bottom and left-to-right and enlarged.

Figure 8:
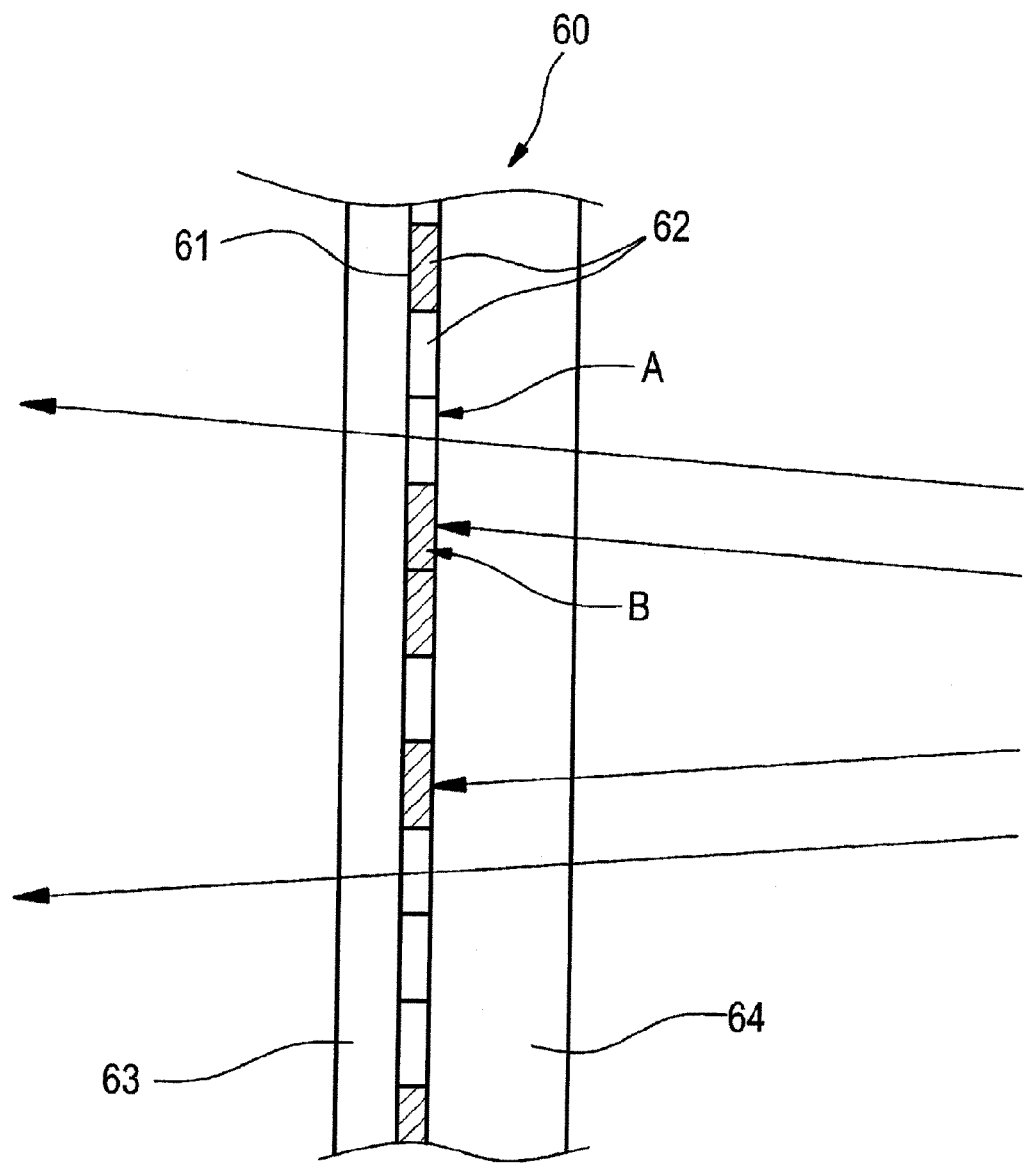
FIG. 8 is a partially enlarged view showing a liquid crystal device.

FIG. 8 is an enlarged view of the liquid crystal device 60. A plurality of liquid crystal devices 62 (optical elements) are arranged in a matrix manner on the projection plane 61 of the liquid crystal device 60. These liquid crystal devices 62 constitute the projection plane 61, which transmits the light from the LED 4. Also, a cover glass 63 (transparent cover) for protecting the liquid crystal element 62 is mounted on the projection plane 61. The liquid crystal elements 62 are individually provided and sealed in the matrix manner between the cover glass 63 and a transparent electrode 64.

The liquid crystal elements 62 are controlled individually by a control signal input from the controller 7 (not shown). The liquid crystal element 62 are configured to be switchable between (i) an output state (transmission state) in which the light from the LED 4 is transmitted therethrough and output toward the projection lens 6 as indicated by an arrow A and (ii) a non-output state (non-transmission state) in which the light from the LED 4 is blocked and is not output toward the transparent lens 6 as indicated by an arrow B. The controller 7 can form a desired illumination pattern on the projection plane 61 by switching each liquid crystal element 62 between the transmission state and the non-transmission state.

Even in the case where the liquid crystal device 60 is used as the two-dimensional image forming device, an output rate (s) per unit time of the light which is output toward the projection lens 6 from the liquid crystal elements 62 disposed at an end portion (peripheral portion) of the projection plane 61 is set to be lower than that (those) of the liquid crystal elements 62 other than the liquid crystal elements 62 disposed at the end portion of the projection plane 61. Thereby, it is possible to lower a luminance in an end portion of the light distribution pattern, and a bright and dark boundary line can be made inconspicuous. Accordingly, it is possible to provide a vehicle lamp that can form a light distribution pattern having a natural appearance.

What is claimed is:

1. A method of controlling a vehicle lamp,
the vehicle lamp comprising
    a projection lens,
    a two-dimensional image forming device that is disposed near a rear focal point of the projection lens and that includes a projection plane formed of a plurality of optical elements arranged in a matrix manner, and
    a light source that illuminates with light the projection plane of the two-dimensional image forming device,
the method comprising:
    forming a light distribution pattern by projecting an illumination pattern, which is formed on the projection plane by driving the optical elements individually, ahead of the vehicle lamp by the projection lens,
    wherein the light source illuminates a first region inside the projection plane and a second region outside the projection plane,
    wherein both end portions, in a lateral direction, of the light distribution pattern are substantially parallel to each other, wherein light is output toward the projection lens from each optical element at an output rate per unit time of each optical element, and wherein the output rates per unit time of the optical elements disposed at an end portion of the projection plane are set to be lower than those of the optical elements other than the optical elements disposed at the end portion of the projection plane.

2. The method according to claim 1, wherein the output rates of the optical elements are set to be lowered gradually from a center of the projection plane toward the end portion of the projection plane.

3. The method according to claim 1, wherein of the optical elements which are set to be in an output state where the optical elements output the light from the light source ahead of the vehicle lamp through the projection lens, the output rates of the optical elements disposed at the end portion of the projection plane are set to be lower than those of the optical elements other than the optical elements disposed at the end portion of the projection plane.

4. The method according to claim 1, wherein the optical elements are configured to be switchable between (i) an output state where the light from the light source is output ahead of the vehicle lamp through the projection lens and (ii) a non-output state where the light from the light source is not incident onto the projection lens, and ratios Ta/Tb of the optical elements disposed at the end portion of the projection plane are set to be lower than those of the optical elements other than the optical elements disposed at the end portion of the projection plane, where Ta of an optical element in interest denotes a time during which the optical element in interest is in the output state within the unit time, and Tb of the optical element in interest denotes a time during which the optical element in interest is in the non-output state within the unit time.

5. The method according to claim 1, wherein the end portion of the projection plane contains two sides of the projection plane, the two sides facing each other.

6. A vehicle lamp comprising:

a projection lens;

a two-dimensional image forming device that is disposed near a rear focal point of the projection lens and that includes a projection plane formed of a plurality of optical elements arranged in a matrix manner;

a light source that irradiates with light the projection plane of the two-dimensional image forming device; and a controller that individually drives the optical elements to form, on the projection plane, an illumination pattern having a shape corresponding to a light distribution pattern to be projected by the projection lens ahead the vehicle lamp, wherein the light source illuminates a first region inside the projection plane and a second region outside the projection plane, wherein both end portions, in a lateral direction, of the light distribution pattern are substantially parallel to each other, wherein light is output toward the projection lens from each optical element at an output rate per unit time of each optical element, and wherein the controller sets the output rates per unit time of the optical elements disposed at an end portion of the projection plane to be lower than those of the optical elements other than the optical elements disposed at the end portion of the projection lens.

7. The vehicle lamp according to claim 6, wherein the controller sets the output rates of the optical elements to be lowered gradually from a center of the projection plane toward the end portion of the projection plane.

8. The vehicle lamp according to claim 6, wherein the controller sets the output rates of the optical elements so that of the optical elements which are set to be in an output state where the optical elements output the light from the light source ahead of the vehicle lamp through the projection lens, the output rates of the optical elements disposed at the end portion of the projection plane are set to be lower than those of the optical elements other than the optical elements disposed at the end portion of the projection plane.

9. The vehicle lamp according to claim 6, wherein the optical elements are configured to be switchable between (i) an output state where the light from the light source is output ahead of the vehicle lamp through the projection lens and (ii) a non-output state where the light from the light source is not incident onto the projection lens, and the controller sets ratios Ta/Tb of the optical elements disposed at the end portion of the projection plane to be lower than those of the optical elements other than the optical elements disposed at the end portion of the projection plane, where Ta of an optical element in interest denotes a time during which the optical element in interest is in the output state within the unit time, and Tb of the optical element in interest denotes a time during which the optical element in interest is in the non-output state within the unit time.

10. The vehicle lamp according to claim 6, wherein the end portion of the projection plane contains two sides of the projection plane, the two sides facing each other.

* * * * *